United States Patent
Ptucha et al.

(10) Patent No.: US 10,528,795 B2
(45) Date of Patent: Jan. 7, 2020

(54) IMAGING WORKFLOW USING FACIAL AND NON-FACIAL FEATURES

(71) Applicant: KODAK ALARIS INC., Rochester, NY (US)

(72) Inventors: Raymond William Ptucha, Honeoye Falls, NY (US); Alexander C. Loui, Penfield, NY (US); Mark D. Wood, Penfield, NY (US); David K. Rhoda, Rochester, NY (US); David Kloosterman, Rochester, NY (US); Joseph Anthony Manico, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 15/335,273

(22) Filed: Oct. 26, 2016

(65) Prior Publication Data

US 2017/0046561 A1 Feb. 16, 2017

Related U.S. Application Data

(63) Continuation of application No. 14/457,415, filed on Aug. 12, 2014, now Pat. No. 9,552,374.
(Continued)

(51) Int. Cl.
*G06K 9/00* (2006.01)
*G06K 9/62* (2006.01)
(Continued)

(52) U.S. Cl.
CPC ......... *G06K 9/00228* (2013.01); *G06F 16/51* (2019.01); *G06F 16/5838* (2019.01);
(Continued)

(58) Field of Classification Search
CPC . G06F 16/51; G06F 16/5838; G06K 9/00281; G06K 9/00362; G06K 9/621; G06K 9/00228; G06K 9/00221
See application file for complete search history.

(56) References Cited

U.S. PATENT DOCUMENTS 5,164,831 A 11/1992 Kuchta et al.
5,694,484 A 12/1997 Cottrell et al.
(Continued)

OTHER PUBLICATIONS

Ke et al., "The design of high-level features for photo quality assessment", Proc. Computer Vision and Pattern Recognition, 2006, pp. 419-426.
(Continued)

*Primary Examiner* — Utpal D Shah
(74) *Attorney, Agent, or Firm* — Hogan Lovells US LLP

(57) ABSTRACT

A method for determining an impact score for a digital image includes providing the digital image wherein the digital image includes faces; using a processor to determine an image feature for the faces; using the processor to compute an object impact score for the faces, wherein the object impact score is based at least upon one of the determined image features; weighting the object impact score for the faces based on one of the determined image features for a face; using the processor to compute an impact score for the digital image by combining the weighted object impact scores for the faces in the image; and storing the computed impact score in a processor accessible memory.

10 Claims, 7 Drawing Sheets

Related U.S. Application Data

(60) Provisional application No. 61/867,239, filed on Aug. 19, 2013, provisional application No. 61/867,241, filed on Aug. 19, 2013.

(51) Int. Cl.
  *G06F 16/51* (2019.01)
  *G06F 16/583* (2019.01)

(52) U.S. Cl.
  CPC ..... *G06K 9/00221* (2013.01); *G06K 9/00281* (2013.01); *G06K 9/00362* (2013.01); *G06K 9/621* (2013.01)

(56) References Cited

U.S. PATENT DOCUMENTS

| | | | |
|---|---|---|---|
| 6,282,317 B1 | 8/2001 | Luo et al. | |
| 6,504,951 B1 | 1/2003 | Luo et al. | |
| 6,535,636 B1 | 3/2003 | Savakis et al. | |
| 6,671,405 B1 | 12/2003 | Savakis et al. | |
| 6,697,502 B2 | 2/2004 | Luo | |
| 6,816,847 B1 | 11/2004 | Toyama | |
| 8,311,364 B2 | 11/2012 | Cerosaletti et al. | |
| 8,724,910 B1* | 5/2014 | Pillai | G06K 9/00288 382/225 |
| 9,183,259 B1* | 11/2015 | Marra | G06F 17/30867 |
| 2004/0037460 A1 | 2/2004 | Luo et al. | |
| 2004/0075743 A1 | 4/2004 | Chatani et al. | |
| 2005/0105775 A1 | 5/2005 | Luo et al. | |
| 2005/0105776 A1* | 5/2005 | Luo | G06K 9/00664 382/115 |
| 2007/0263092 A1 | 11/2007 | Fedorovskaya et al. | |
| 2008/0285860 A1 | 11/2008 | Datta et al. | |
| 2011/0074966 A1* | 3/2011 | Cerosaletti | G06K 9/00664 348/222.1 |

OTHER PUBLICATIONS

Viola et al., "Robust Real-Time Face Detection", Int. Journal of Computer Vision, 2004, vol. 57, pp. 137-154.

Cootes et al., "Constrained Active Appearance Models", 8$^{th}$ International Conference on Computer Vision, 2001, vol. 1, 6 pgs.

Eli Peli, "Contrast in complex images", J. Opt. Soc. Am. A, Oct. 1990, vol. 7, No. 10, pp. 2032-2040.

Erik Murphy-Chutorian, "Head Pose Estimation in Computer Vision: A Survey", IEEE Transactions on Pattern Analysis and Machine Intelligence, 2008, vol. 31, pp. 1-20.

D. Ramanan et al., "Finding and Tracking People from the Bottom up", CVPR, 2003, 8 pages.

T. Burghardt et al., "Analysing Animal Behavior in Wildlife Videos Using Face Detection and Tracking", Vision, Image and Signal Processing, 2006, pp. 1-19.

Shotton et al., "Real-Time Human Pose Recognition in Parts from Single Depth Images", CVPR, 2011, 8 pages.

Duda et al., "Pattern Classification", Second Edition, John Wiley and Sons, New York, 2001, pp. 168-175, 394-413, 478-481, 526-529, 256-265.

M. Bolin & S. Chen, "An Automatic Facial Feature Finding System for Portrait Images", Proceedings of IS&T PICS Conference, 2002, pp. 226-231.

Ptucha et al., "Manifold based sparse representation for facial understanding in natural images", Image and Visual Computing, 2013, vol. 31, pp. 365-378.

J. Pearl, "Causality: Models, Reasoning, and Inference", Cambridge University Press, 2000, pp. 12-26, 280-281.

Yuille et al., "Feature Extraction from Faces Using Deformable Templates", Int. Journal of Computer Vision, 1992, vol. 8, pp. 99-111.

* cited by examiner

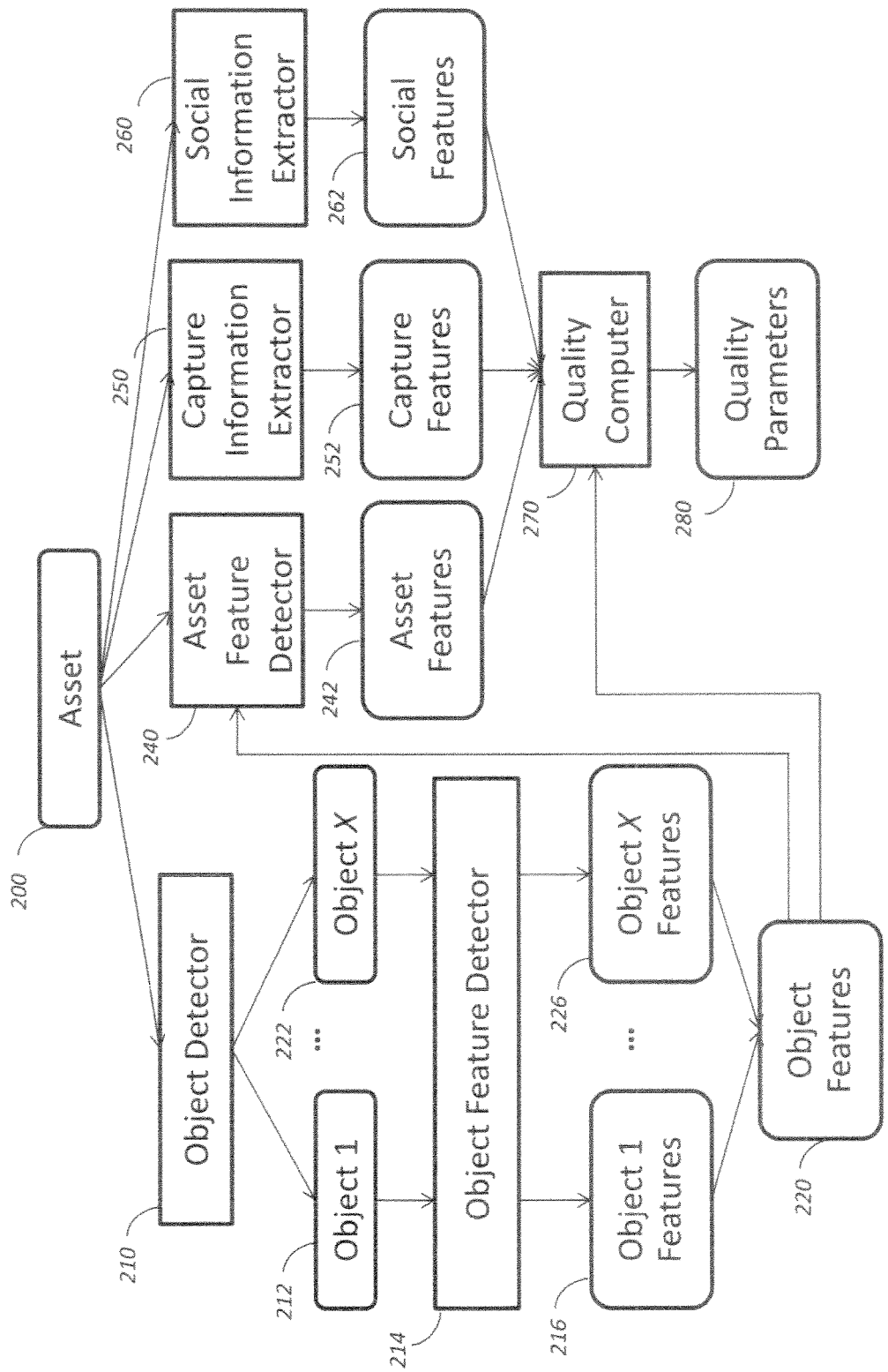

IMAGING WORKFLOW USING FACIAL AND NON-FACIAL FEATURES

CROSS-REFERENCE TO RELATED APPLICATION

This application is a continuation of and claims the benefit of U.S. Non-Provisional application Ser. No. 14/457,415, filed Aug. 12, 2014, entitled "Imaging Workflow Using Facial and Non-Facial Features,", which claims benefit to U.S. Provisional Application No. 61/867,239, filed Aug. 19, 2013, entitled "Imaging Workflow Using Facial and Non-Facial Features," and U.S. Provisional Application No. 61/867,241, filed Aug. 19, 2013, entitled "Imaging Workflow Using Facial and Non-Facial Features," all of which are hereby incorporated in their entirety.

FIELD OF THE INVENTION

This invention relates to digital image enhancement, and more particularly to methods and apparatuses for automatically determining fitness scores of images for initial selection and more pleasing compositions using facial and non-facial features embedded in digital images.

BACKGROUND OF THE INVENTION

Consumer photography collections often contain assets captured by smart phones, tablets, digital cameras, and video recording devices, where asset refers to any media asset, such as a digital still image, or a digital video file. These collections are stored on the capture devices, media from those capture devices, personal computers, personal computer storage devices, cloud based storage, and online social websites. These collections may span multiple family members, relatives, friends, neighbors, and anyone directly or indirectly connected via online social networks.

The task of gathering, organizing, and assembling assets in preparation for sharing with others can be quite difficult. For example, after returning from a family vacation, the family may decide to create a slideshow for display at an extended family reunion. The collection of assets includes a mixture of still, video, and audio content that spans one or more cameras, each of the family smart phones, the family tablet, assets that were shared on social websites, stock assets from online websites of the locale, and may even include online assets of themselves they chose to purchase from a professional photographer or theme-based photo locations such as amusement park rides, famous places, or with animals, bugs, and famous people.

Several product creation tools, such as HP's Photobook Lite for iPad or even walk-up kiosks such as Eastman Kodak's Picture Kiosk allow a consumer to import assets from multiple devices and input modalities to create an output product such as a collage, calendar, photobook, or digital video. Once the product creation tool imports the collection of assets from all the aforementioned storage locations, there are often too many assets to use in the output product. By assigning a fitness score to each asset, the top scoring assets can be suggested for product creation. Often there are several assets which are quite similar to one another. When assets are deemed to be similar enough, only the asset with the highest score of the group of similar assets is used in the product. Further, there needs to be a way to determine which assets are superior to others such that they may be displayed more prominently (larger, more centrally located, or more duration).

U.S. Pat. No. 5,694,484 to Cottrell, et al., entitled "System and method for automatically processing image data to provide images of optimal perceptual quality," describes a system involving several image processing modules and a method for selecting an image processing parameter that will optimize image quality for a given digital image, using information about the image capture device and the intended image output device. The method involves calculating an image quality metric that can be expressed as a series of mathematical transformations. The parameters used to control the image processing modules are varied, the image quality metric is calculated for each permutation of the control parameters, and the control parameters setting which yielded the best value of the image quality metric are used to process the digital image. The method of Cottrell et al. is performed on an individual image basis and therefore does not include an assessment of the quality of the digital image in either a relative or absolute basis relative to other digital images.

U.S. Pat. No. 6,671,405 to Savakis, et al., entitled "Method for automatic assessment of emphasis and appeal in consumer images," discloses an approach which computes a metric of "emphasis and appeal" of an image, without user intervention. A first metric is based upon a number of factors, which can include: image semantic content (e.g. people, faces); objective features (e.g., colorfulness and sharpness); and main subject features (e.g., size of the main subject). A second metric compares the factors relative to other images in a collection. The factors are integrated using a trained reasoning engine. The method described in U.S. Patent Application Publication No. 2004/0075743 by Chantani et al., entitled "System and method for digital image selection," is somewhat similar and discloses the sorting of images based upon user-selected parameters of semantic content or objective features in the images. These approaches have the advantage of working from the images themselves, but have the shortcoming of being computationally intensive.

U.S. Patent Application Publication No. 2007/0263092 to Fedorovskaya, et al., entitled "Value index from incomplete data," discloses an image administration system and method to compute value indices from different combinations of capture data, intrinsic image data, image usage data, and user reaction data. This approach has the advantage of using combined data to calculate a value metric, but has the shortcoming of not utilizing data relevant to aesthetic value.

U.S. Patent Application Publication No. 2008/0285860 to Datta, et al., entitled "Studying aesthetics in photographic images using a computational approach," discloses an approach to compute the aesthetic quality of images in which a one-dimensional support vector machine is used to find features with a noticeable correlation with user aesthetic ratings. Then, automated classifiers are constructed utilizing a simple feature selection heuristic. Numerical aesthetic ratings are inferred.

U.S. Pat. No. 6,816,847 to Toyama, entitled "Computerized aesthetic judgment of images," discloses an approach to compute the aesthetic quality of images through the use of a trained and automated classifier based on features of the image.

Ke, et al., in their article entitled "The design of high-level features for photo quality assessment" (Proc. Computer Vision and Pattern Recognition, pp. 419-426, 2006) disclose an approach to classify images as either "high quality professional photos" or "consumer snapshots." A number of features are proposed: spatial distribution of edges, color distribution, hue count, blur, contrast, and brightness. This approach is useful, but also limited by the metric being binary.

U.S. Pat. No. 8,311,364 to Cerosaletti, et al., entitled "Estimating aesthetic quality of digital images," discloses an approach to compute the aesthetic quality of images through the use of a trained and automated classifier based on features of the image.

SUMMARY OF THE INVENTION

According to the present invention, a method for determining an impact score for a digital image comprises providing the digital image wherein the digital image includes one or more faces; using a processor to determine at least one image feature for each of the one or more faces; using the processor to compute an object impact score for each of the one or more faces, wherein the object impact score is based at least upon one of the determined image features; weighting the object impact score for each of the one or more faces based on at least one of the determined image features for the face; using the processor to compute an impact score for the digital image by combining the weighted object impact scores for the one or more faces in the image; and storing the computed impact score in a processor accessible memory. The method further includes using the processor to determine a size and a location for each of the one or more faces; and weighting the object impact score for each of the one or more faces based on the location and the size of the face in the image. The image features include size, location, brightness, contrast, eye blink, facial expression, sharpness, noise, and colorfulness.

According to the present invention, a method for adjusting an impact score for an appearance of a person in a digital image based on a profile for the person comprises providing the digital image including the person; providing a parameter profile for the person, the parameter profile including weighting scores for a plurality of features for the person; using a processor to determine at least one image feature for the person; using the processor to compute an object impact score for the person based at least upon one of the determined image features; weighting the object impact score for the person using the parameter profile; and storing the object impact score in a processor accessible memory. The method further includes using the processor to adjust the parameter profile for the person based on the determined image features for the person in the digital image. The image features include size, location, brightness, contrast, eye blink, facial expression, sharpness, noise, and colorfulness. The parameter profile includes weighting scores for individual features and includes weighting scores for demographic features.

BRIEF DESCRIPTION OF THE DRAWINGS

Preferred embodiments of the present invention will be more readily understood from the detailed description of exemplary embodiments presented below considered in conjunction with the attached drawings, of which:

FIG. 2 illustrates a computer system embodiment for modifying a digital image according to an embodiment of the present invention.

DETAILED DESCRIPTION OF THE INVENTION

Digital capture devices have made it possible for consumers to capture and save vast numbers of media assets. The number of media assets can be overwhelming, making it difficult for consumers to find appropriate assets and determine which are best to share with their family or friends. Embodiments of the present invention provide ways to efficiently compute a hierarchical metric, referred to herein as an "asset quality structure," which provides a measure of the quality of individual instances of subject matter in a media asset as well as an overall measure of quality for each asset, as well as a measure of quality for a collection of assets. The asset quality structure is an automatically computed set of metrics for assessing the expected value of an object in an asset, the asset itself, or a collection of assets based upon quality, usefulness, or other perceived value by a user. The asset quality structure is determined by extracting features related to people, which directly augment estimates of exposure, tonescale, color, structure, and composition, which determine the quality of measures.

The phrase "asset," as used herein, refers to any media asset, such as a digital still image, a digital video file, or a frame extracted from a digital video file. Further, it should be noted that, unless otherwise explicitly noted or required by context, the word "or" is used in this disclosure in a non-exclusive sense.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

Figure 1:
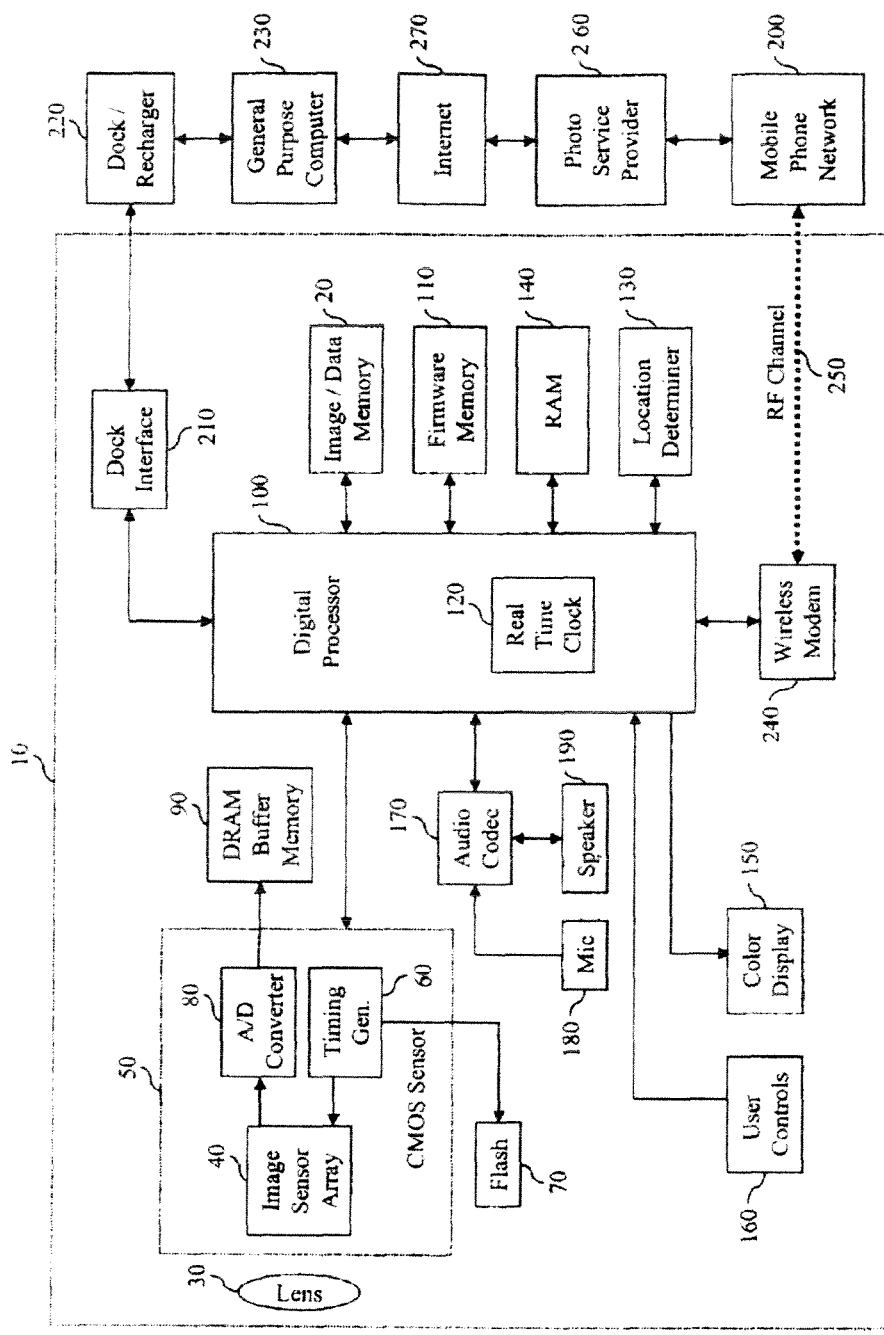
FIG. 1 illustrates components of an apparatus and system for modifying a digital image according to an embodiment of the present invention.

FIG. 1 is a block diagram of a digital camera phone 10 based imaging system that can be used to implement the present invention. The digital camera phone 10 is one type of digital camera. The present invention can also be implemented for use with any other type of digital imaging device, such as other types of digital still camera or digital video cameras, or with any system that receives digital images.

Preferably, the digital camera phone 10 is a portable battery operated device, small enough to be easily handheld by a user when capturing and reviewing images. The digital camera phone 10 produces digital images that are stored using the image/data memory 20, which can be, for example, internal Flash EPROM memory, or a removable memory card. Other types of digital image storage media, such as magnetic hard drives, magnetic tape, or optical disks, can alternatively be used to provide the image/data memory 20.

The digital camera phone 10 includes a lens 30 that focuses light from a scene (not shown) onto an image sensor array 40 of a CMOS image sensor 50. The image sensor array 40 can provide color image information using the well-known Bayer color filter pattern. The image sensor array 40 is controlled by timing generator 60, which also controls a flash 70 in order to illuminate the scene when the ambient illumination is low. The image sensor array 40 can have, for example, 1280 columns×960 rows of pixels.

In some embodiments, the digital camera phone 10 can also capture and store video clips. Often the process of forming the video clips includes summing multiple pixels of the image sensor array 40 together (e.g. summing pixels of the same color within each 4 column×4 row area of the image sensor array 40) to create a lower resolution video image frame. The video image frames are then read from the image sensor array 40 at regular intervals, for example using a 24 frame per second readout rate.

The analog output signals from the image sensor array 40 are amplified and converted to digital data by the analog-to-digital (A/D) converter 80 on the CMOS sensor 50. The digital data is stored in a DRAM buffer memory 90 and subsequently processed by a digital processor 100 controlled by the firmware stored in firmware memory 110, which can be flash EPROM memory. The digital processor 100 includes a real-time clock 120, which keeps the date and time even when the digital camera phone 10 and digital processor 100 are in their low power state.

The processed digital image files are stored in the image/data memory 20. The image/data memory 20 can also be used to store asset quality structure determined using the method of the present invention. The image/data memory 20 can also store other types of data, such as photographer id, image of the photographer, rankings of photographers, and phone numbers.

In the still image mode, the digital processor 100 performs color interpolation followed by color and tone correction, in order to produce rendered image data, typically in the well-known sRGB color space. The digital processor 100 can also provide various image sizes selected by the user. The rendered sRGB image data is then JPEG compressed and stored as a JPEG image file in the image/data memory 20. The JPEG image file will typically use the well-known EXIF (EXchangable Image File Format) image format. This format includes an EXIF application segment that stores particular image metadata using various TIFF tags. Separate TIFF tags can be used, for example, to store the date and time the picture was captured, the lens F/# and other camera settings, and to store image captions. In particular, the ImageDescription tag can be used to store labels. The real-time clock 120 provides a capture date/time value, which is stored as date/time metadata in each Exif image file.

The location determiner 130 provides the geographic location associated with an image capture. The location determiner 130 may use any of a number of methods for determining the location of the image. For example, the geographic location may be determined from the location of nearby cell phone towers or by receiving communications from the well-known Global Positioning Satellites (GPS). The location is preferably stored in units of latitude and longitude. Note that the location determiner 130 may determine the geographic location at a time slightly different than the image capture time. In that case, the location determiner 130 can use a geographic location from the nearest time as the geographic location associated with the image. Alternatively, the location determiner 130 can estimate the geographic location at the time of image capture using geographic locations determined at times before or after the image capture time. This may be necessitated because it is not always possible for the location determiner 130 to determine a geographic location. For example, the GPS receivers often fail to detect signal when indoors. In that case, the last successful geographic location (i.e. prior to entering the building) can be used by the location determiner 130 to estimate the geographic location associated with a particular image capture. Alternatively, the geographic location can be estimated by interpolating between geographic locations determined at times before and after the image capture time.

The digital processor 100 can also create a low-resolution "thumbnail" size image, as described in commonly-assigned U.S. Pat. No. 5,164,831, entitled "Electronic Still Camera Providing Multi-Format Storage of Full and Reduced Resolution Images" to Kuchta, et al., the disclosure of which is herein incorporated by reference. The thumbnail image can be stored in Random Access Memory (RAM) 140 and supplied to a color display 150, which can be, for example, an active matrix LCD or organic light emitting diode (OLED). After images are captured, they can be quickly reviewed on the color display 150 by using the thumbnail image data.

The graphical user interface displayed on the color display 150 is controlled by user controls 160. The user controls 160 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like.

An audio codec 170 connected to the digital processor 100 receives an audio signal from a microphone 180 and provides an audio signal to a speaker 190. These components can be used both for telephone conversations and to record and playback an audio track, along with a video sequence or still image. The speaker 190 can also be used to inform the user of an incoming phone call. This can be done using a standard ring tone stored in firmware memory 110, or by using a custom ring-tone downloaded from a mobile phone network 200 and stored in the image/data memory 20. In addition, a vibration device (not shown) can be used to provide a silent (e.g. non audible) notification of an incoming phone call.

A dock interface 210 can be used to connect the digital camera phone 10 to a dock/charger 220, which is in turn connected to a general purpose computer 230. The dock interface 210 may conform to, for example, the well-known USB interface specification. Alternatively, the interface between the digital camera phone 10 and the general purpose computer 230 can be a wireless interface, such as the well-known Bluetooth wireless interface or the well-known 802.11b wireless interface. The dock interface 210 can be used to download images from the image/data memory 20 to the general purpose computer 230. The dock interface 210 can also be used to transfer information (e.g., calendar data) from the general purpose computer 230 to the image/data memory in the digital camera phone 10. The dock/charger 220 can also be used to recharge the batteries (not shown) in the digital camera phone 10.

It should also be noted that the present invention can be implemented in a combination of software and hardware and is not limited to devices that are physically connected or located within the same physical location. The digital processor 100 is coupled to a wireless modem 240, which enables the digital camera phone 10 to transmit and receive information via an RF channel 250. The wireless modem 240 communicates over a radio frequency (e.g. wireless) link with the mobile phone network 200, such as a 3GSM network. The mobile phone network 200 can communicate with a photo service provider 260, which can store digital images uploaded from the digital camera phone 10. These images can be accessed via the Internet 270 by other devices, including the general purpose computer 230. The mobile phone network 200 also connects to a standard telephone network (not shown) in order to provide normal telephone service.

The invention is inclusive of combinations of embodiments described herein. References to "a particular embodiment" and the like refer to features that are present in at least one embodiment of the invention. Separate references to "an embodiment" or "particular embodiments" or the like do not necessarily refer to the same embodiments; however, such embodiments are not mutually exclusive, unless so indicated or as are readily apparent to one of skill in the art. The use of singular and/or plural in referring to the "method" or "methods" and the like is not limiting.

Referring now to FIG. 2, a method is described for determining quality parameters 280 for a media asset 200 according to an embodiment of the present invention. According to this embodiment, a collection of media assets 200 is provided and quality parameters 280 are determined for each one. A variety of different object detectors can be computed successfully with respect to the assets 200 in accordance with the present invention. For example, well known object detectors include face detection, person detection, and main subject detection, but similar techniques can be used to find almost any type of object.

In one embodiment, the object detector 210 is utilized to find human faces, and the detected faces form objects 212, 222 in asset 200, where X is the number of faces found. Preferably, these facial objects 212, 222 are found using a face detection algorithm. Methods for detecting human faces are well known in the art of digital image processing. For example, a face detection method for finding human faces in images is described in the article "Robust real-time face detection" by Viola, et al. (Int. Journal of Computer Vision, Vol. 57, pp. 137-154, 2004). This method utilizes an "integral image" representation that consists of the immediate horizontal and vertical sums of pixels above a specific pixel location. Then, the full integral image can be computed as a successive summation over any number of array references. These rectangular features are input to a classifier built using the AdaBoost learning algorithm to select a small number of critical features. Finally, the classifiers are combined in a "cascade" so that the image background regions are discarded so that algorithms can operate only on face-like regions.

An object feature detector 214 is used to extract object features 216, 226 from the detected objects 212, 222. If the objects are faces, the facial features (e.g. eyes, nose, mouth, etc.) are localized using well known methods such as described by Yuille et al. in, "Feature extraction from faces using deformable templates" (Int. Journal of Computer Vision, Vol. 8, pp. 99-111, 1992). This approach uses a method of using energy minimization with template matching for locating the mouth, eye and iris/sclera boundary. Facial features can also be found using active appearance models as described by Cootes, et al. in the article "Constrained active appearance models" (8th International Conference on Computer Vision, Vol. 1, pp. 748-754, 2001).

In one aspect of the present invention, the method of locating facial feature points is based on an Active Shape Model (ASM) of human faces described by Bolin and Chen in the article "An Automatic facial feature finding system for portrait images" (Proceedings of IS&T PICS Conference, 2002) is used.

In some embodiments, a confidence score is associated with each located facial object, measuring the likelihood that the identified region in fact corresponds to a face.

It is well-known that a standard measure of the face size is the distance between the eyes which is a common output of most face detectors. The entire face can also be localized by using the x, y location of the eyes. Other common outputs of typical face detectors are the x, y image coordinates for vertices of a rectangular bounding box that encompasses the detected face. The face location can alternately be estimated by the centroid of the facial feature points and the size can be estimated by the area of the bounding box.

Additional analysis is performed on the pixel values enclosed by the facial bounding box to determine face contrast, brightness, and image structure. The contrast of the face is computed by first converting the image into a visual domain such as CIELAB (a well-known color spaces defined by the International Commission on Illumination, abbreviated as CIE). This color space consists of a lightness channel (L*) and two chroma channels, a* and b*. Brightness and contrast computations are performed on the lightness channel of the image contained by the facial bounding box area. The face area is normalized to a canonical representation before processing. Eye and mouth corner points extracted from the face of interest enable precise facial localization. In a preferred embodiment, these eye and mouth corner points are projection mapped to a canonical reference face of 60×51 pixels, with left eye coordinates of {(12,21), (20,21)}, right eye coordinates of {(34,21) (42, 21)}, and mouth coordinates of {(17,45), (36,45)}. Because each face has unique eye and mouth corner points, the 3×3 projection matrix is solved on an image by image basis.

Both the image pixels and ASM facial feature points are passed through this 3×3 projection matrix. After warping, facial regions can be processed independently using the ASM localized facial feature points. Empirical studies have shown that when the face exhibits yaw, the side of the face facing the camera is a better predictor for image quality parameters such as brightness, contrast, sharpness, and noise. For example, the side of the face away from the camera is not as well lit, and may unfairly characterize the asset as under exposed, low contrast, low color, and of higher noise. In the warped canonical state, simple masks can extract pixels from any location of the face.

To determine if one side of the face is preferable to the other, the areas of the left and right cheeks are computed using the unwarped ASM facial feature points. If the area of the two is within $\alpha$%, the face is frontal and both cheeks are used. In a preferred embodiment, $\alpha$=15. If the area of the left cheek is greater than $\alpha$% of the right check, the person's yaw is directing to the right, and the left cheek is used for facial analysis.

A simple representation of the brightness of the face is computed using the mean of the cheek lightness values (L*).

The noise of the face is computed using the standard deviation of the cheek lightness values (L*). The contrast of the image is computed by first computing the histogram of the entire face region, normalizing the area to 1.0, subtracting the mean code value, then determining the codevalue span of midtone pixels, where the codevalue span of midtone pixels are the minCodevalue subtracted from the maxCodevalue, where maxCodevalue is the codevalue that contains x % of all pixels, and minCodevalue is the codevalue that contains y % of all pixels. In a preferred embodiment, x=95% and y=5%. Alternatively, other means can be used to compute contrast and brightness for complex images such as those described by Peli in "Contrast in Complex Images" (JOSA, Vol A 7, Iss. 10, 1990, pp. 2032-2040).

The size of the face can be computed via the eye corner points or intraocular distance. If the eye corner points are used and the Euclidean distance between the left and right eye width is within β%, the face is frontal and both cheeks are used. In a preferred embodiment, β=10. If the length of the left eye is greater than β% of the right eye, the person's yaw is directing to the right, and the left eye is more stable and used for facial size analysis. For natural scenes, it has been determined that the frontal facing eye width is more predictive of facial size than the backward facing eye. The size of the face is computed as 2×frontal eye width.

If the eye centroids are used, the intraocular distance between eyes is used after yaw correction. As the human face turns side to side, the 2D projection of intraocular distance varies as a function of yaw. This has the unfortunate side effect of decreasing the facial size from what it actually is, had it been frontal facing. Intraocular distance is normalized by yaw using:

$$\Delta' = \Delta \sum_{j=0}^{4} c_j yaw^j \quad (1)$$

where Δ is the inter-ocular distance in the image, and Δ' is the boosted inter-ocular distance as if the subject were facing forward. The parameter c was solved by Ptucha et al. in "Facial Pose Tracking for Interactive Display" (WNYIPW, 2009) as [1.0, 0.0, 0.00014943, 0.0, 0.00000003].

The static and transient natures of the human face are also important facial features. The static features include aspects that typically do not change during a session such as gender, race, age, facial hair, glasses, and hat. The transient features include pose, eye blink, expression, mouth open, tongue out, and occlusions such as hand or cup in front of the face. The canonical face pixels and facial feature points are passed into machine learning techniques to make estimates of each. Murphy-Churtorian et al. in "Head Pose Estimation in Computer Vision", Pattern and Machine Intelligence, Vol. 31, 2009 describes how to estimate pose. Ptucha et al. in "Manifold Based Sparse Representation for Facial Understanding in Natural Images", Image and Visual Computing, Vol. 31, 2013 describes how to estimate facial expression, gender, race, glasses, facial hair, and how do detect facial occlusions. Identical techniques are used for other facial aspects such as facial identity, eye blink, mouth open, etc.

When the detected overall object features 216, 226 are faces, these constituent features include the size and location of the face; the pitch, roll, and yaw of the face; the contrast, brightness, color balance, and noise of the face; the gender, race, hair style and neatness appearance, and identity of the face; the facial expression, eye blink, eye gaze, red eye, mouth open, teeth detection, tongue detection, glasses detection, hat detection, and occlusion detection of the face. More generally, when the detected object features are people, the constituent features may include clothing, including the color of the clothing, the style such as formal wear versus casual wear, and condition including state of wrinkleness, wear, or disarray. In addition, the detected features may include other environmental factor such as the surrounding scene and/or a characterization of the scene, including outdoor urban, outdoor park, indoor formal setting or indoor casual setting.

A main subject detection algorithm such as that disclosed in U.S. Pat. No. 6,282,317 to Luo et al. entitled "Method for automatic determination of main subjects in consumer images" can also be used in place of the object detector 210 to compute the location, size, contrast, brightness, color balance, and noise of any main subject. This method extracts regions of arbitrary shape and size defined by actual objects. It then groups the regions into larger segments corresponding to physically coherent objects, extracts structural and semantic saliency features, and integrates saliency features using a probabilistic reasoning engine into an estimate of a belief that each region is the main subject. The main subject belief map consists of a probability value P(x, y) as a function of the x, y image coordinates, where the estimate of belief is expressed as a probability value and is assigned to a grayscale value.

The location of the entire main subject is estimated by the centroid of the main subject weighted by the probability. The centroid ($C_x$, $C_y$) of the main subject is computed as:

$$\begin{bmatrix} C_x \\ C_y \end{bmatrix} = \begin{bmatrix} \dfrac{\sum_n x_n(P(x_n, y_n))}{N} \\ \dfrac{\sum_n y_n(P(x_n, y_n))}{N} \end{bmatrix} \quad (2)$$

where $x_n$ and $y_n$ are the x and y image coordinates for the $n^{th}$ image pixel, and N is the total number of image pixels.

The size of the probable main subject is computed by counting the number of pixels for which P(x, y)>k, for some constant k. In one preferred embodiment, k=0.50. In other embodiments, the size of the probable main subject may be computed by computing the number of pixels for which P(x,y) is greater than some value f(x,y), where the threshold is dependent upon the values of the neighboring pixels. The size of the main subject should be measured as a fraction of the entire image to achieve invariance to scaling:

$$\text{size of main subject} = \frac{\text{number of main subject pixels}}{\text{number of total image pixels}} \quad (3)$$

The brightness of the probable main subject is computed by computing the mean of the pixels for which P(x,y)>0.50. The color balance of the probable main subject is computed by computing the hue and saturation of the pixels for which P(x, y)>0.50. The noise of the probable main subject is computed by computing the standard deviation of the pixels for which P(x, y)>0.50. The contrast of the probable main subject is computed by computing the max-min pixel code value range of the pixels for which P(x, y)>0.50 that make up the inner 90% of the cumulative histogram. Again, other constant or computed values may be used as the thresholds, instead of 0.50 as used in the exemplary preferred embodiment.

It should be obvious that the object detector 210 can be expanded to include any particular object of interest. For example, instead of human faces, we can extract regions based upon human body or human torso as described in Ramanan, D., Forsyth, D. A. "Finding and Tracking People From the Bottom Up," CVPR 2003, which is incorporated herein by reference in its entirety. Similarly, using identical techniques used to train human face detectors as described by Burghardt, T. Calle, J., "Analysing Animal Behavior in Wildlife Videos Using Face Detection and Tracking," Vision, Image and Signal Processing, 2006, which is incorporated herein by reference in its entirety, we can train to find animals of any sort, including pet dogs, cats, or even fish; or train on bacterium, viruses, or internal organs; or trained to find cars, military vehicles, or parts off an assembly line. Further, with the introduction of depth cameras such as Microsoft's Kinect and silhouette extraction techniques such as described in Shotton, Jamie et. Al. "Real-Time Human Pose Recognition in Parts from Single Depth Images," CVPR 2011, which is incorporated herein by reference in its entirety, it is common to find and track humans in real-time and such humans can be segmented by depth, pose, or gesture.

An asset feature detector 240 is used to detect asset features 242 in asset 200. These features include brightness, colorfulness, number of hues, color distribution, sharpness, noise, and contrast. Some of these features are also detected as object features 220, and supplement the asset feature detector 240. Further, the size, location, and number of object features 216, 226 serve as useful inputs to the asset feature detector 240 in determining final asset features 242.

The asset feature detector 240 can extract a variety of different color features such as colorfulness, number of hues, and color distribution are known to those skilled in the art and can be computed for asset 200 in accordance with the present invention. A method to compute a colorfulness value for media asset 200 is described by U.S. Pat. No. 6,671,405 to Savakis et al., which is incorporated herein by reference. In this method, image pixel values of the asset 200 are converted to a luminance-chrominance color space and the chrominance plane is quantized into twelve chromaticity plane wedges or bins. Image pixels are associated with a particular bin based on the value of the pixel's chrominance component. For those active bins in which the number of high saturation pixels has exceeded a specified threshold, colorfulness C is computed as:

$$C = \frac{\min\{\text{Number of active bins, 1.0}\}}{10} \quad (4)$$

A method for calculating the number of hues that can be used in an embodiment of the present invention is described by Ke, et al. in the article "The design of high-level features for photo quality assessment" (Proc. Computer Vision and Pattern Recognition, 419-426, 2006). In this method, the number of hues is calculated by first converting image pixel values of the asset 200 to the HSV color space and then, computing a 20-bin histogram using the H values which have saturation greater than 0.2 and brightness in the range of 0.15 to 0.95. The number of hues in a grayscale image is 1.

A method for calculating a color distribution that can be used in an embodiment of the present invention is described in the aforementioned article "The design of high-level features for photo quality assessment," by Ke, et al. In this method, the image is composed of red, green, and blue channels. The red, green, and blue channels are quantized into 16 values. A histogram is created that is composed of $4096=16^3$ bins to give the count of each quantized color present in the image. The histogram should be normalized to unit length to allow for absolute comparisons between media assets. A well-known $L_1$ statistical metric can be used to calculate the distance between histograms. Alternately, the histogram values can be used directly as color features.

Similarly, a structure feature detector within the asset feature detector 240 is used to detect structure features as part of the asset features 242 in the asset 200. A variety of different structure features such as sharpness, and spatial distribution of edges are known to those skilled in the art and can be computed for assets 200 in accordance with the present invention. One method of calculating a spatial distribution of edges is described in the aforementioned article "The design of high-level features for photo quality assessment," by Ke, et al. In this method, an edge spatial distribution feature extractor is implemented. A 3×3 Laplacian filter with α=0.2 is applied separately to each of the red, green, and blue channels. Then, the mean is taken across the three channels. The Laplacian image is resized to 100×100 pixels and the image sum is normalized to 1 to allow for absolute comparison between images and within groups of media asset content categories such as images with people and images without people. The $L_1$ statistical metric can be used to calculate the distance between pairs of Laplacian images. Alternatively, the Laplacian image can be used to compute an image structure feature by measuring the amount of area that the edges occupy by computing the area of a bounding box that encloses a certain percentage (e.g., the top 96.04%) of the edge energy.

A method of calculating sharpness features by using a sharpness detector as described in detail by U.S. Pat. No. 6,535,636 to Savakis et al., which is incorporated herein by reference, is used. Sharpness of an asset 200 is found through converting the image to grayscale, detecting image edges, creating an edge histogram, finding the strongest-edge regions, computing statistics of strongest-edges, and using the average of the strongest edges as an estimate of sharpness.

A capture information extractor 250 is utilized to identify capture features 252 for an asset 200. The capture information extractor 250 determines the capture features 252 related to the capture of the asset 200, and outputs the resulting capture features 252. The capture features 252 can include, for example, the date and time the asset 200 was captured, the focal length, the subject distance, the magnification, whether the flash was fired, whether the self-timer was activated, global positioning satellite (GPS) coordinates, and the image resolution. Those skilled in the art will recognize a variety of different possible methods for the capture information extractor 250 to determine capture features 252. Often times, capture features 252 are embedded in the file header of the asset 200. For example, EXIF metadata can be used by the asset capture device to store information associated with the capture of the asset 200. For example, the "Date/Time" metadata entry is associated with the date and time the asset 200 is captured. The capture information extractor 250 uses the most appropriate method for extracting the capture features 252 for the assets 200. The capture feature of image resolution (i.e., the number of rows and columns of image pixels) is used as capture features 252 in a preferred embodiment of the present invention.

A scene information extractor is used to identify scene features for an asset 200. Scene classifiers identify or classify an image as representing one or more scene types such as indoor or outdoor, urban, restaurant, park or yard. Material and texture classifiers identify or classify an image as containing one or more materials or texture types, such as rock, sand, grass, or blue sky. Object classifiers identify or classify an image as containing one or more objects, such as car, cat, or bicycle. Operation of such classifiers are described in the literature, including U.S. Pat. No. 6,282,317 entitled "Method for automatic determination of main subjects in photographic images"; U.S. Pat. No. 6,697,502 entitled "Image processing method for detecting human figures in a digital image assets"; U.S. Pat. No. 6,504,951 entitled "Method for Detecting Sky in Images"; U.S. Patent Application Publication 2005/0105776 entitled "Method for Semantic Scene Classification Using Camera Metadata and Content-based Cues"; U.S. Patent Application Publication 2005/0105775 entitled "Method of Using Temporal Context for Image Classification"; and U.S. Patent Application Publication 2004/003746 entitled "Method for Detecting Objects in Digital image assets." Research in image understanding algorithms continues to result in new and improved scene, material activity and object classifiers and recognizers, which can easily be incorporated into the invention. Recent work enables a wide range of scene types to be classified, given sufficient positive and negative training exemplars.

A social information extractor 260 is utilized to identify social features 262 for an asset 200. The social information extractor 260 determines the social features 262 related to the capture of the asset 200, and outputs the resulting social features 262. The social features 262 can include, for example, the number of likes for the asset 200, comments, tags, viewings, downloads, links to other photo collections, upload date, was image used as a profile pictures, similarity to other assets in other photo collections, and statistics on the owners of the comments, tags, likes, etc. Similarly, the temporal history of asset, including the timestamps of each action, owner of each action, owner demographics of each action, and backward and forward pedigree of each action can be quite useful. The backward pedigree includes a trail of asset history—i.e.: Asset was the result of a reply to a reply to a blog post. The forward pedigree includes a forward looking trail—i.e.: the posting of this asset cause follow-on posts by others.

A quality computer 270 is used to compute an aesthetic quality parameter 280 responsive to the object features 220, asset features 242, capture features 252, scene features, and social features 262. Although certain embodiments have been thus described herein, the invention is not exclusive of other different forms of object features 220, asset features 242, capture features 252, scene features and social features 262 that can be computed for an asset 200. Those skilled in the art will recognize a variety of different features that make asset 200 estimates of color, tone, structure, and composition can be input to the quality computer 270 to compute quality parameters 280. Further, it is not necessary for the quality computer 270 to utilize all of these different feature types in the computation of the quality parameter 280. For example, in one embodiment of the present invention, only the object features 220 are used in the computation of the quality parameter 280.

The quality parameters 280 are a single one-dimensional value, since this allows simpler comparisons between media assets. In another preferred embodiment of the present invention, the quality parameters 280 contain the individual components that can optionally result in a one-dimensional value. For example, a user may only be concerned with asset colorfulness. In another preferred embodiment, the quality parameters form a vector. For example, if objects whose quality is being assessed or scored are a person, then the quality parameters may form a vector of values, or even a multidimensional vector of values, including disparate types of values such as the facial features, the clothing features, and the scene features. Two vector-based quality parameters may be compared, for example, by comparing the Euclidean distances of the two parameters relative to some zero-point origin. The vectors may be further weighted according to either a static or dynamic weighting. Confidence values may be associated with the individual components; the confidence values may then be incorporated into the comparison between two quality parameters. The resulting quality parameters 280 can be associated with the assets 200 by use of a database or can be stored as metadata in the media asset digital file.

A simplistic approach that the quality computer 270 can use to determine the quality parameter 280 is to simply sum up equally valued or weighted inputs. If the inputs are weighted, then the weighting may be determined based upon the expected or perceived importance of the inputs. For example, if the inputs correspond to different face objects each with an associated confidence score, the weight may be a function of the confidence score, such that face objects with higher confidence scores are weighted more heavily. However, preferably more sophisticated methods are used to determine the quality parameter 280. In a particular embodiment, the quality computer 270 is a reasoning engine that has been trained to generate quality parameters 280 through a classification process. In the reasoning engine, different input values, identified by respective inputs, can compete or reinforce each other according to knowledge derived from the results of the true quality values from human observers-evaluations of real images. In this case, confidence scores may simply serve as an additional set of inputs. Competition and reinforcement are resolved by the inference network of the reasoning engine. A currently preferred reasoning engine is a Bayes net.

The true quality parameter values are gathered from human observers-evaluations of real images. By using empirical data collection methods, a psychometric experiment can be conducted in which human observers evaluate a variety of different images. For example, images can be rated using a 0 to 100-point scale bi-anchored with "lowest imaginable" and "highest imaginable" for pleasing attributes. The aforementioned features can then be computed for all of these images. The image ratings are considered true quality parameters and can then be provided as a training data set to the reasoning engine. The image ratings can also be clustered by the patterns of human observer responses utilizing techniques such as k-means clustering as described by Duda et al. in "Pattern Classification" (John Wiley and Sons, New York, 2001). These clusters can also be provided as a training data set to the reasoning engine. Quality parameters specific to a given individual or population may also be inferred from preexisting collections of images wherein data is or may be associated with each image. For example, social media such as Facebook provides a vast collection of imagery from which image ratings may be inferred. First, one may assume that imagery posted on social media will generally portray individuals wherein their appearances show more pleasing attributes. Second, auxiliary data such as comments or the number of likes associated with an image may be used to further refine the typically noisy data typically present in such systems. For example, it may be assumed that comments of the form "you look stunning/beautiful/gorgeous" typically are associated with pictures wherein the portrayed person does in fact have a more pleasing appearance. Commonly used natural language processing techniques and semantic dictionaries such as WordNet may be further employed to interpret the emotive meaning of comments. Such mechanisms result in a set of exemplars or training data, which may need to be complemented with other sources of data to provide a more balanced dataset.

One reasoning engine, a Bayes net, is a directed acyclic graph that represents causality relationships between various entities in the graph, where the direction of links represents causality relationships between various entities in the graph. (For a discussion of Bayes nets see, for example. "Causality: models, reasoning, and inference" by J. Pearl (Cambridge University Press, Cambridge, 2000). Evaluation is based on knowledge of the joint Probability Distribution Function (PDF) among various entities.

Other reasoning engines may be employed in place of the Bayes net. For example, in the aforementioned text, "Pattern Classification" by Duda et al., a variety of different classifiers are described that can be used to solve pattern recognition problems, where having the right set of features is normally the most important consideration. Such classifiers include support vector machines (SVM), AdaBoost, linear discriminant analysis methods, artificial neural networks, non-parametric methods, and tree-structured classifiers. It will be obvious to anyone of ordinary skill in such methods that any of these classifiers can be adopted as the reasoning engine for practice of the present invention. The quality computer 270 will have a plethora of input features. To make the computational engine more tractable, and to make the input features more discriminant, dimensionality reduction techniques can be utilized. Further, a dictionary of features can be used to improve the accuracy of the quality computer 270. Ptucha et al. in "Manifold Based Sparse Representation for Facial Understanding in Natural Images", Image and Visual Computing, Vol. 31, 2013 describes how to use both dimensionality reduction and sparse representation for facial features. Identical techniques can be used for any feature to quality parameter mapping problem.

The generation of a low dimensional space can also enable the programmer to determine the vector of importance for each dimension. For example, using such techniques it is possible to create a single dimension corresponding to the quality of pose, another for smile, another for blink, another for size, etc.

Figure 3A:
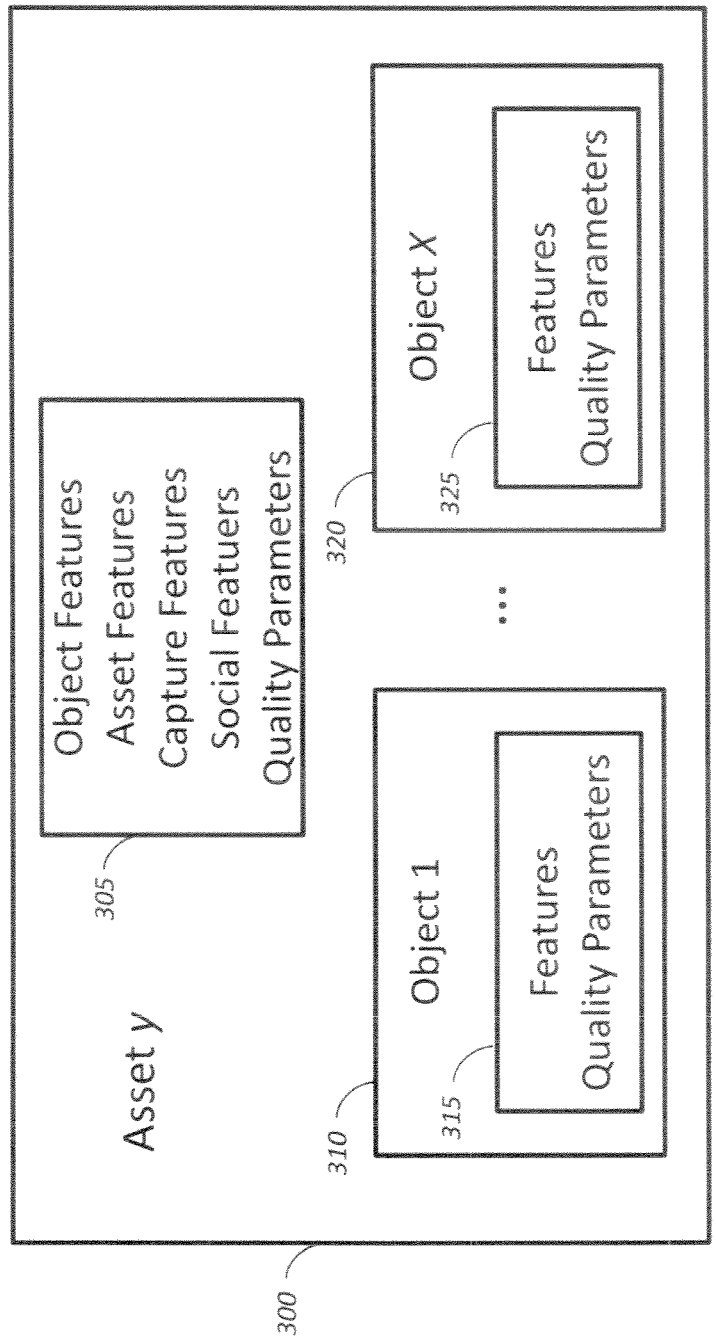
FIG. 3A is a block diagram that shows the relationship between X objects in an asset according to an embodiment of the present invention.

Referring to FIG. 3A, each object 310, 320 in an asset 300 has its own features and quality parameters 315, 325. When objects are human faces, these parameters include facial size, expression, eye blink, pose, brightness, identity, etc. When subjects are human bodies, quality parameters include size, pose, gesture, clothing type and appearance, brightness, identity, scene type, etc; when subjects are determined by a main subject detector, these parameters include size, colorfulness, location, brightness, etc. When the object detector 210 is trained to recognize other objects, such as dogs or cars, the subject features are modified to the subject in question, for example dogs would have size, pose, gesture, hair color, etc; cars would have size, pose, color, style, etc.

By including both features and quality parameters with each object, it is possible to select objects with certain features (e.g., long hair, glasses, male) or with a threshold of acceptable quality levels (e.g., overall quality parameter >0.75). In FIG. 3A, there are X objects in the image, where each object x, x=1 ... X, has its own features and quality parameters.

The asset 300 also has its own features and resulting quality parameters 305. In a simplistic fashion, the object features can be the mean of all X features. Improved results utilize object detection confidence values to weight individual object influence. Even better results are found if the size and location of the object are taken into account.

Figure 4:
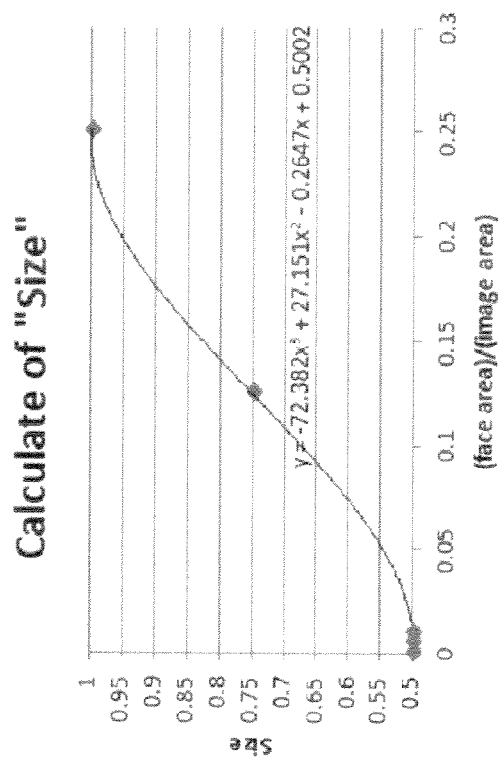
FIG. 4 is a graph that shows a sample mapping f( ), from object area normalized by total asset area, to a metric called size according to an embodiment of the present invention.

When objects are human faces, the size is typically the intraocular distance, or the area of each face. FIG. 4 shows a sample mapping f( ), from object area normalized by total asset area, to a metric called size.

$$\text{size} = f\left(\frac{objectArea}{assetArea}\right) \quad (5)$$

In the mapping in FIG. 4, all objects >25% of the asset area are of maximum and equal importance, and as objects take up less space in the asset, they become less important.

For the location, a measure called centrality is utilized, where centrality is a Gaussian fit to the 2D Gaussian formula:

$$\text{centrality}(x, y) = \frac{1}{2\pi\sigma_x\sigma_y} e^{-\frac{\left[\frac{\Delta_x^2}{\sigma_x^2} + \frac{\Delta_y^2}{\sigma_y^2}\right]}{2}} \quad (6)$$

Figure 5:
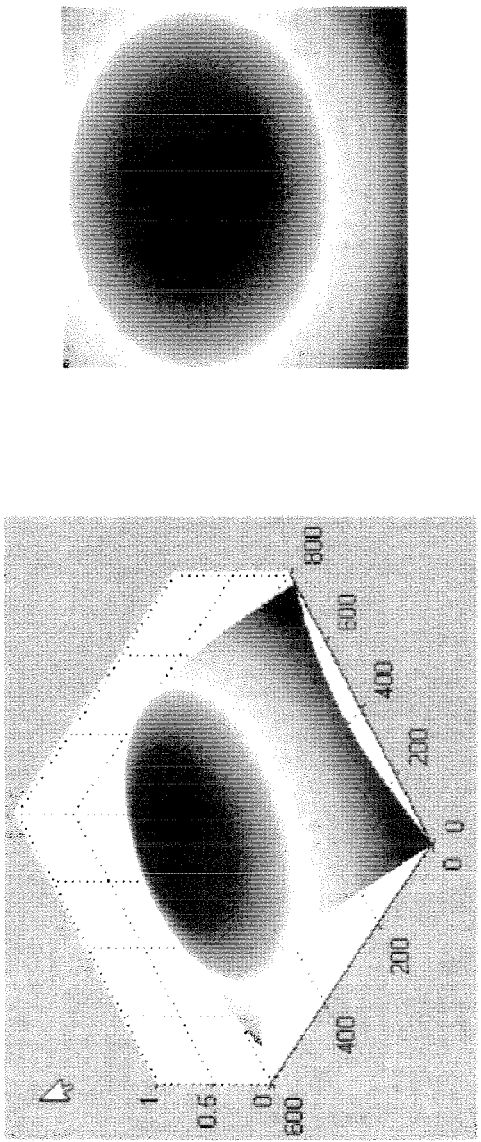
FIG. 5 shows a sample centrality importance map according to an embodiment of the present invention.

Where:
$\sigma_x$=2×imageWidth/3
$\sigma_y$=2×imageHeight/3
$\Delta_x$=abs(objectCentroidX−imageWidth/2)
$\Delta_y$=abs(objectCentroidY−3×imageHeight/5)
image Width is the width of the image in pixels
imageHeight is the height of the image in pixels
objectCentroidX is the centroid column of the object bounding box
objectCentroidY is the centroid row of the object bounding box FIG. 5 shows a sample centrality importance map, where the hotter regions are the more important regions and the cooler regions are less important. This importance map can be any 2D function, and often, a middle region of the image can have equal emphasis. It should be readily obvious how to expand this function to be any mask or function, including a weighted sum of Gaussian functions.

To combine size and centrality, a measure called objectImpact is developed, which requires that objects need to be both large and optimally located to have a high weight. In general, optimally located is often a variant of centrally located, but can be any map of the sort shown in FIG. 5. ObjectImpact is defined as:

$$objectImpact=\alpha size \times \beta centrality \quad (7)$$

The values of $\alpha$ and $\beta$ are scalars that assign more or less importance to the object size and object location. By default, $\alpha=\beta=1$. However, if it is determined that size is more important, then $\alpha>\beta$. Eq. (7) can be extended to include any number of parameters, each with unique scalar weights.

Using the notion of objectImpact, it is possible to calculate an impact score for the overall asset for each facial feature. If there are X objects detected in an asset, each of these objects has an object feature 216, 226, and we can combine these into a single object feature 220 using the objectImpact for each object feature:

$$\text{objectFeatureImpact} = (\Sigma_{i=1}^{X} \text{objectImpact}_i \text{objectFeature}_i)/X \quad (8)$$

Similarly, other useful object features 220 can be created from the individual object features 216, 226, where each is weighted by its corresponding objectImpact score. For example, the minimum and maximum features weighted by impact score are calculated as:

$$\text{MinObjectFeatureImpact} = \min_i \text{objectImpact}_i \text{objectFeature}_i, \quad i=1\ldots X \quad (9)$$

$$\text{MaxObjectFeatureImpact} = \max_i \text{objecImpact}_i \text{objectFeature}_i, \quad i=1\ldots X \quad (10)$$

Where X is the number of detected objects, objectImpact, is the weight or importance assigned to each object, and objectFeature$_i$ is the calculated feature for each object. For example, if objects are faces, each face in an asset has an eye blink feature. Rather than averaging the eye blink features of all detected faces to report the overall asset eye blink feature, each eye blink is weighted. For example, if eye blink is weighted by faceImpact, an eyeBlinkImpact feature is formulated. The asset eye blink feature is then a function of these individual eyeBlinkImpact features, the two most important features for eye blink being the mean and minimum of all eyeBlinkImpact features. In this fashion eye blink from small faces on the edge of the picture are not as important as eye blink on larger faces in the center of an image.

The object impact objectImpact$_i$ for a given object may be computed in part based upon the intended, expected, or current viewers of the asset. For example, if the object is a face, and the identity of the face is known using any of the variety of previously discussed facial recognition techniques, then the faceImpact or object impact may be adjusted based upon the preferences of the intended or current viewers. For example, the mother of the bride viewing wedding photos may place a greater importance on the appearance of the bride than the groom, and a greater importance on the appearance of the groom than on the groom's parents. If the intended or current audience contains multiple people, than the object impact may be computed as a function of the individual preferences.

The relative importance of the subject to the viewer may be either statically specified, or automatically determined. In the case where the presentation of assets is done in a digital fashion, the importance may be determined on the fly by using a built-in camera found on most laptops and tablets. As such, the importance will change automatically as a function of the viewer. The viewer can be determined via demographics (age, gender, race, etc.), or by identity.

The importance of a given object may also be determined at least in part by the frequency of the object within a collection of assets. The collection of assets may be the collection containing the asset containing the object being scored. Alternatively, the collection may be a secondary collection, such as the collection of images belonging to a user in a social media framework such as Facebook, or the collection of images belonging to user and their social network in such a framework. For example, people recognition using clustering may be used to group faces. A face belonging to a person that is well-represented in a collection may be given greater weight than a face belonging to a person that is observed just once in a collection. For example, pictures from a vacation will often feature family or friends who typically will appear in multiple pictures. However, strangers may appear in various pictures as part of the backdrop; such individuals are not likely to appear in multiple pictures. Likewise, random strangers are not likely to appear in pictures belonging to the user or the user's social network in a third party social media framework. Consulting social media can help prevent the error that might occur by simply considering the frequency of an object within a single collection of assets, such as the set of pictures taken during a trip. For example, a user may have captured a single picture of a relative, but the relative should not be considered a stranger. By consulting the pictures, and/or the reported relationships, found in a framework such as Facebook, the [system] can avoid the error of concluding a given person is a stranger and therefore unimportant when in fact they are not. Once objects are determined to be unimportant, the objectImpact$_i$ of such objects may be discounted; alternatively, the presence of such objects may be counted negatively.

Using methods previously described, the brightness, contrast, colorfulness, sharpness, and noise can be calculated independently for each object, as well as for the entire asset. Some features such as brightness calculate well over the entire asset. Other features, such as noise, are especially problematic to calculate over the entire asset. As such, referring back to FIG. 2, the object features 220 are used to aid the asset feature detector 240. For example, noiseImpact as calculated from all faces in the asset is fed into the noise feature detector, and perhaps weighted quite high. Similarly, brightnessImpact as calculated from all faces in the asset is fed into the brightness feature detector, and weighted lower. Similar to the way impact scores weight individual objects in an image, object detection confidence scores can used in combination.

FIG. 3A shows the relationship between X objects in an asset. It should be readily evident objects can be faces, people, main subjects, or other objects as previously described. Two or more different object types in a single asset can be combined as a single object feature 220 as:

$$\text{MergeObjectFeature} = \Sigma_{i=1}^{q} \theta_i \text{ObjectFeatureImpact}_i \quad (11)$$

Where q is the number of object types, $\theta_i$ is the weight or importance assigned to each object type, and ObjectFeatureImpact$_i$ is the individual weighted object feature for each object type. For example, a single asset may have 5 faces, one dog, and a single main subject. Each object type has their own impact scores used to create an object feature for faces, dogs, and main subject. These three object types are then combined via a weighted summation to create the object features and eventually quality parameters 305. In a preferred embodiment, these weights favor faces as the most important, followed by pets, main subjects, people, then other objects. However, if the purpose was to extract company logos as the object of importance, this can be weighted higher.

Figure 3B:
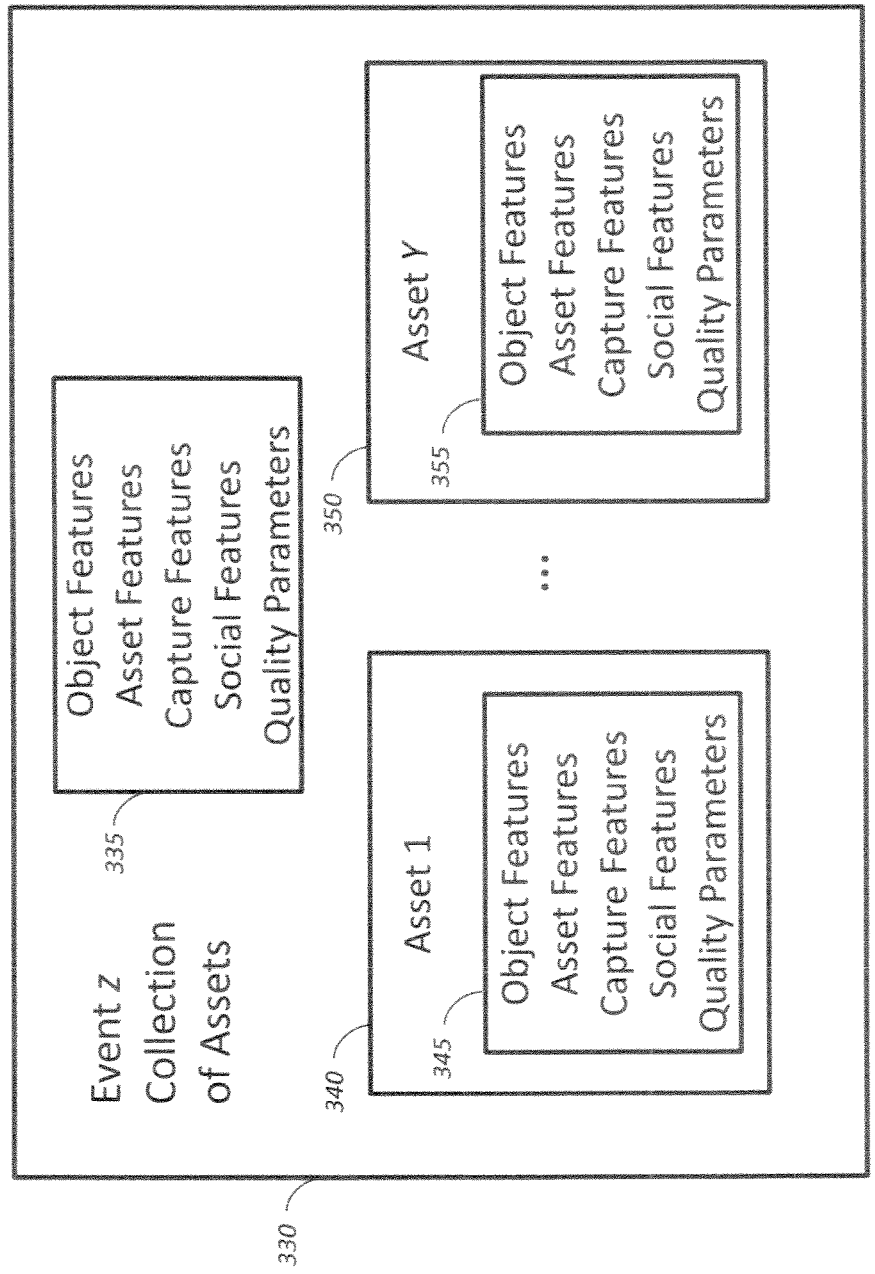
FIG. 3B is a block diagram that combines multiple assets from a single event into an overall event set of features and parameters according to an embodiment of the present invention.

FIG. 3B combines multiple assets from a single event into an overall event set of features and parameters. In particular, each asset y has its own features and parameters, $y \in 1 \ldots Y$, with Y assets in the event. This has two purposes, 1) this allows the renormalization of all assets in an event to an overall canonical average; and 2) provides a measure of quality of a particular set of assets for an event. The former is useful, so that, for instance, if all images at a particular vacation event were dark, or unsharp, they would be shifted higher before comparison with assets from other events. If they were not shifted higher, they would never be selected for an enhanced photographic product where only a top percentage of assets get selected. If this were an important vacation event, a user would probably want some of these images to be selected for the enhanced photographic product, even if the overall quality parameters were lower than average. This renormalization increases the probability of selection of some assets from this event. The latter purpose is helpful if there are several sources of assets from the same event. For example, at the vacation event, assets may come from a camera, and two smartphones. It certainly would intrigue a user if the overall quality from each device could automatically be determined, and be beneficial to choose assets from higher quality capture devices. At the same time, normalizing across the different capture devices can help ensure that assets are not chosen from higher quality capture devices at the exclusion of lower capture devices, if that is not the consumer's intent. For example, a husband and wife vacationing together may travel with different capture devices, one using a smart phone, and the other using a digital SLR camera. Without some sort of normalization, the pictures from the DSLR may be chosen at the expense of the smart phone, resulting in certain subjects or scenes not getting selected at all. In one preferred embodiment, bias is given towards assets captured by the higher quality capture devices only when comparable assets (matching scene or object) are also available from other lower-quality capture devices.

A social network is a social structure made of individuals (or groups of individuals) called "nodes," which are linked by one or more specific types of interdependency, such as friendship, kinship or relationships of beliefs, knowledge or prestige. In some cases, it can be convenient to use a graphical representation to illustrate the social relationships between people (or groups of people) in a social network. In such graphical representations, people are typically represented by vertices, and social relationships are represented by connections between the vertices. Two people in a social network are said to be "linked" if there is a connection between the vertices representing the people.

A number of internet sites have recently become popular for providing a way for members of a social network to communicate and share information with each other. These internet sites are sometimes referred to as online social networks. Using these social links and online social networks, assets are shared amongst many users. Instead of only having assets from a family camera and family smart-phones, now when compiling an enhanced photographic product, assets can be solicited from this broad net of online social connections. Moreover, both frequency and type of interactions as well as self-reported relationships in an online social network may be used to provide a measure of the relative importance of one person to another. In addition, social networks typically provide a mechanism to associate identity with facial regions; this information may be used as exemplars to enable a facial detection algorithm perform people recognition.

Figure 3C:
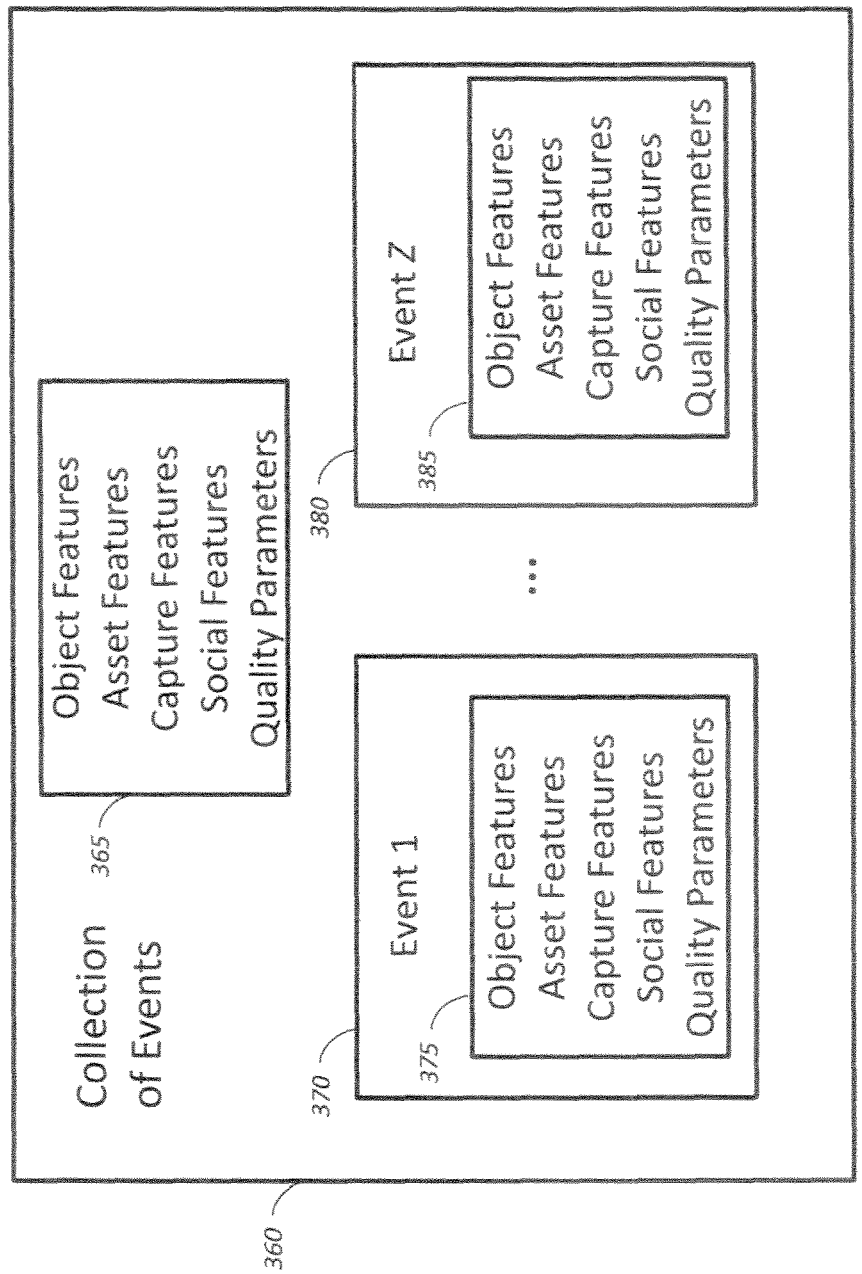
FIG. 3C is a block diagram that extends the notion of feature and quality parameters across a user collection according to an embodiment of the present invention.

While FIG. 3B, extends the notion of asset feature and quality parameters across an event, FIG. 3C extends the notion of feature and quality parameters across a user collection. As such, we can both normalize scores across collections, and/or provide measures or quality from one collection to another. A collection can be from a single user, or span the user's online social links. One collection may be from scans of film, another from an older digital camera, another from a new camera, another from a smartphone, another from a photographic social sharing site, another from a social networking site, another from a sibling's secure disk card, and another may be from a cousin's private online disk storage service.

Once again, if a year in summary review were being done, we can normalize each event, or each collection of events, to ensure both selection of best assets, as well as inclusion of assets from a variety of collections.

This normalization of scores can be done both at the asset collection level as well as on the individual level. Using facial recognition techniques, all faces of "Aunt Suzie" can be normalized such that her mean scores and distribution of scores match a population average. For example, Aunt Suzie may never smile, and therefore if an asset is found where Aunt Suzie is almost happy, this should get scored very high for expression or smile rating. On the contrary, "Cousin Bob" may always be smiling, therefore to score high for expression or smile, Cousin Bob must be expressing an exceptionally brilliant smile. Similarly, if Cousin Bob typically squints with one eye, then the eye blink value may be discounted or even ignored for his faces. In one preferred embodiment, a parameter profile is stored for each known person, where the profile provides weighting scores appropriate for that individual. The profile is determined by analyzing known faces for a given person. Social media frameworks may be used as a source of known faces. Auxiliary data such as comments and the number of likes associated with face-containing images may be used to further refine the weighting scores. The profile may be further updated over time, as new assets containing the specified person are added to the system, with the characteristics of more recent assets potentially have a greater weight than older assets. By weighting more recent content more highly, the profile will adapt to how the individual's appearance changes over time.

Normalization of scores may change and be adoptable by age, gender, race, culture, or other population segment. For example, the mean smile of all males may be lower than the mean smile of all females, therefore the smile distribution score of males is adjusted to match that of females. Since the detection of age, gender, race, etc. can be done without user interaction, this correction can not only be learned automatically over large collections, but it can continually be learned over time, and more importantly, adjustments can be applied on the fly without any user interaction or be custom to a specific collection of assets.

Quality parameters 280 determined according to the method of the present invention can be useful in the process of suggesting possible uses for images having high quality and selecting specific media assets for use types such as printing, sharing, displaying. Assets can also be used to produce specialty photographic products. Specialty photographic products include mugs, calendars, mouse pads, greeting cards, ornaments, photobooks, and digital slide shows.

Sample uses of the quality parameters 280 include, but are not limited to:

1) Retrieval of one or more assets from a larger collection or networked collection of assets, based upon the quality parameters 280. For example, a search engine may ask for colorful images, containing two people, with low contrast, good sharpness, captured in the year 2013, and one of the people should have the identity of "Aunt Suzie".

2) Culling a large collection or networked collection of assets such that the top n assets are selected for a specialty photographic product. For example, a photographer may take a few hundred photos at a wedding, and have access to dozens more taken by patrons of the wedding, but only have room for 150 of them in a photobook. To aid the photographer in doing an initial layout of the photobook, the top scoring 150 images are automatically inserted into the photobook.
3) Determining which of m duplicate images are the best. When taking pictures of one or more people, photographers often take one picture, then request the subjects to pose for a second, third, or more photo. The idea is that hopefully one of the images comes out good, with all subjects paying attention, eyes open, and having a pleasing expression. Given m duplicate images, the best image can automatically be retrieved.
4) When laying out multiple assets on a single view or page of special photographic product, it is often desirable to make some assets larger, while others smaller. The overall quality parameter 280 is used as a predictor of how much real-estate each asset should take up on the single view.
5) When laying out multiple assets on a single view or page, or on two facing pages, it is often desirable to choose assets that are mutually agreeable with one another. For example, it might be a good idea to choose assets that have similar subject matter, similar color, or other similar asset features. Similar in this case can mean of the same, or can just mean pleasing, whereby pleasing sometimes means opposite such as blue and yellow looking good together. By placing individual features of each object in a vector, and computing a L2 norm, assets are similar with have similar color, sharpness, noise, etc. Additionally, when laying out images with faces onto two facing pages, the eye gazes and poses of the faces can be selected so that the two facing pages will look pleasing to the consumers. For example, the pose and gaze of a face on one page can be selected to be opposing to the one on the facing page with both facing toward the middle of the two pages. When there are multiple people or subjects in an image, it may be desirable to select the best subjects for later reuse, or if image retargeting will be performed (auto zoom and crop), it would be helpful to know which are the more and less important subjects in the image.
6) When printing or displaying assets, it is often desirable to change the aspect ratio of the asset to match an output aspect ratio or to produce a more attractive layout. In such cases, the image asset may need to be cropped. The cropping may be performed in such a way so as to minimize the change in the quality parameters, or to maximize the quality parameters of the resulting cropped asset.
7) When printing or displaying pictures of a given person, it may be that none of the candidate pictures of a person are completely satisfactory. Knowledge of desirable feature values specific to that given individual may be used to manipulate the appearance of a person in a given image to more closely match a more desirable appearance. For example, exemplar data from a social media framework such as Facebook may be analyzed to determine the feature values most commonly associated with acceptable pictures of a given person. The appearance of a person in a given image may then be subtly manipulated to improve its feature values.
8) When selecting pictures of a given person for a particular product, the context of the product may be important for determining how to weight the various quality parameters associated with a given object. For example, the importance of some quality features in a photo album of a camping trip will be different than the importance of those same features in a photo album of a wedding. Hair neatness, clothing appearance or even eye squinting may be of little importance in a camping album while in a wedding these features may be discriminating factors. As another example, a person with wind-blown hair may look acceptable in an outdoor picture, but look less acceptable in an indoor picture. By incorporating the scene type as one of the quality parameters, the quality parameters may be more appropriately combined and compared. Factors such as but not limited to scene, season, and time of day may be used to change the weighting of the quality parameters. In addition, given sufficient exemplar data, an embodiment may be able to generate different profiles for a given person for different environments, such as different scenes or time-of-day.

Note that the method of computing the quality parameters, including the determination of any associated weighting values, may depend upon the intended application.

Given a large collection of assets, special bias or attention should be given to rare occurrences. For example, if a collection of assets is determined to be from a few large events, and a few small events, the assets from the small event should be preferentially scored higher to ensure they get selected into a specialty photographic product. Similarly if an event has many assets, they should be scored lower so they do not dominate the specialty photographic product.

With regards to improving the quality of facial renditions in an image, standard techniques include blemish removal and morphological blending of faces with an ideal face. With facial quality parameters in hand, more aggressive image enhancement is automatically applied to lower scoring images. For example, when performing blemish/red-eye/wrinkle reduction or facial beautification, faces with high quality parameters are given minor changes, while faces scoring lower get more and more correction.

The methods described not only aid the creation of digital enhanced photo products, but can also aid in the initial capture process. For example, a Facial based quality parameter can be used as a camera capture control. A camera directed at a subject will capture an image when the Quality parameter is maximized. Similarly, the frame in a video segment with maximum quality parameter is automatically tagged, or the quality parameter for each from can be saved for later usage.

In another embodiment of the current invention, the camera assigns a rating for facial image quality continuously. As such, the subject could adjust their expression to enhance their score. Audio/visual cues to enhance quality parameter score such as audio feedback suggesting "smile more", "open your eyes wider", "turn your face slightly to the left", etc will not only generate higher quality originals, but train subjects how to be better subjects for picture taking in general. This could also be used to extract clips and stills from live or recorded video streams. Further, the user could set a numeric threshold so that only images that met or exceeded the threshold would be automatically selected.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention.

The invention claimed is:
1. A method, implemented as computer software and executed via a computer processor, for determining an aesthetic quality parameters of a collection media assets, the method comprising:

for each media asset in the collection of media assets:
  accessing a media asset from the collection of media assets;
  detecting objects appearing in the media asset, wherein the objects comprise people;
  extracting object features from the objects in the media asset, wherein the object features comprise facial features;
  detecting an asset feature in the media asset, wherein the asset feature is selected from the group consisting of: brightness, colorfulness, number of hues, color distribution, sharpness, noise, and contrast;
  detecting a capture feature, wherein the capture feature comprises information about the media asset obtained at the capture of the media asset;
  detecting a social feature of the media asset, wherein the social feature comprises information about the media asset obtained via social interaction;
  computing an aesthetic quality parameter based on the object features, the asset feature, the capture feature, and the social feature, wherein the aesthetic quality parameter is a multidimensional vector comprising disparate types of values;
  associating the aesthetic quality parameter with the media asset; and
identifying which media asset in the collection of media assets has the highest aesthetic quality based on the aesthetic quality parameter assigned to each media asset in the collection of media assets.

2. The method of claim 1 wherein detecting objects appearing in the media asset comprises detecting human faces.

3. The method of claim 1 wherein the facial features are selected from the group consisting of: face size, face location, face pitch, face roll, face yaw, face contrast, face brightness, face color balance, face noise, gender, race, hair style, neatness of appearance, identity, facial expression, eye blink, eye gaze, red eye, mouth open, teeth detection, tongue detection, glasses detection, hat detection, and occlusion detection of the face.

4. The method of claim 1 wherein the object features further comprises clothing features, wherein the clothing features are selected from the group consisting of: clothing color, clothing style, clothing condition.

5. The method of claim 1 wherein the object features further comprises environmental features.

6. The method of claim 1 wherein the objects further comprise human bodies, human torsos, animals, bacterium, viruses, internal organs, cars, and assembly line parts.

7. The method of claim 1 wherein the capture feature comprises one or more of the following types of information: date and time that the media asset was captured, focal length, subject distance, magnification, presence of a flash, presence of a self-timer, GPS coordinates, and image resolution.

8. The method of claim 1 wherein the social feature comprises one or more of the following types of information: number of likes of the media asset, comments, tags, viewings, downloads, links to other photo collections, upload date, and whether the media asset was used as a profile picture.

9. The method of claim 1 wherein computing the aesthetic quality parameter comprises summing up equally weighted inputs of the object features, the asset feature, the capture feature, and the social feature.

10. The method of claim 1 wherein detecting the asset feature in the media asset comprises detecting brightness, colorfulness, number of hues, color distribution, sharpness, noise, and contrast for each of the objects appearing in the media asset.

* * * * *